United States Patent
Guo et al.

(10) Patent No.: US 10,144,090 B2
(45) Date of Patent: Dec. 4, 2018

(54) PROCESS AND DEVICE FOR SIMULTANEOUS LASER WELDING

(71) Applicant: Shanghai Seeyao Electronics Co., Ltd., Shanghai (CN)

(72) Inventors: Zhaoji Guo, Shanghai (CN); Xiaofeng Yang, Shanghai (CN); Guoxiang Xin, Shanghai (CN); Hai Huang, Shanghai (CN); Yonghe Wang, Shanghai (CN)

(73) Assignee: Shanghai Seeyao Electronics Co., Ltd., Shanghai (CN)

( * ) Notice: Subject to any disclaimer, the term of this patent is extended or adjusted under 35 U.S.C. 154(b) by 436 days.

(21) Appl. No.: 15/077,234

(22) Filed: Mar. 22, 2016

(65) Prior Publication Data

US 2017/0014948 A1    Jan. 19, 2017

(30) Foreign Application Priority Data

Jul. 17, 2015 (CN) .......................... 2015 1 0423267
Jul. 28, 2015 (CN) .......................... 2015 1 0452594

(51) Int. Cl.
*B23K 26/21* (2014.01)
*B23K 26/10* (2006.01)
(Continued)

(52) U.S. Cl.
CPC .......... *B23K 26/21* (2015.10); *B23K 26/0006* (2013.01); *B23K 26/10* (2013.01); *B29C 65/1612* (2013.01); *B29C 65/1635* (2013.01); *B29C 65/1667* (2013.01); *B29C 65/1687* (2013.01); *B29C 65/7841* (2013.01); *B29C 66/1122* (2013.01); *B29C 66/301* (2013.01); *B29C 66/542* (2013.01); *B29C 66/73921* (2013.01); *B29C 66/8242* (2013.01); *B29C 66/8322* (2013.01); *F21S 41/29* (2018.01);

*F21V 17/101* (2013.01); *B29C 65/1677* (2013.01); *B29C 66/8122* (2013.01); *B29L 2031/747* (2013.01)

(58) Field of Classification Search
CPC ..... B23K 26/21; B23K 26/0006; B23K 26/10
USPC .......................... 219/121.63, 121.64, 121.82
See application file for complete search history.

(56) References Cited

U.S. PATENT DOCUMENTS

| | | | | |
|---|---|---|---|---|
| 4,143,660 A | * | 3/1979 | Malyshev | ............ A61B 17/072 219/121.63 |
| 2004/0142642 A1 | * | 7/2004 | Thepot | .................... B24B 9/148 451/43 |

FOREIGN PATENT DOCUMENTS

CN         105382410 A       3/2016

* cited by examiner

*Primary Examiner* — Samuel M Heinrich
(74) *Attorney, Agent, or Firm* — The Dobrusin Law Firm, PC

(57) ABSTRACT

This invention provides a process and device for simultaneous laser welding; after using the moving lower die and the fixing upper die to make the base and the lens attached, by using the light pipe, for example, transparent substances or other cheap materials, to make the laser, which is emitted from the laser source, emit through the lens to a welding region of the base after being processed, to operate rapid and average heating to the welding region; meanwhile, using the welding cylinder to press the base and the lens together, to make base and the lens pressed and welded together in molten state, and when welding, it does not generate powder or other defects, and, at the same time, it can make the height H and the width w of the generated waste selvage between [0, 0.4] mm, which can improve the performance of welding object more efficiently.

12 Claims, 4 Drawing Sheets

(51) Int. Cl.
*B29C 65/16* (2006.01)
*B29C 65/78* (2006.01)
*B29C 65/00* (2006.01)
*F21V 17/10* (2006.01)
*B23K 26/00* (2014.01)
*F21S 41/29* (2018.01)
*B29L 31/00* (2006.01)

PROCESS AND DEVICE FOR SIMULTANEOUS LASER WELDING

CROSS-REFERENCE TO RELATED APPLICATIONS

The present application claims priority to and the benefit of Chinese Patent Applications No. CN 201510452594.4, filed on Jul. 28, 2015, and No. CN 201510423267.6, filed on Jul. 17, 2015, the entire content of which is incorporated herein by reference.

BACKGROUND OF THE INVENTION

1. Field of the Invention

This invention relates to the field of laser welding technology, in particular, to a process and device for simultaneous laser welding.

2. Description of the Related Art

Laser welding is an efficient and precise welding method using a laser beam with high-energy density as heat source, which is mainly used for welding thin-wall material and low-speed welding; since the welding process belongs to heat conduction, i.e. laser radiation heats the workpiece surface; the heat of the surface diffuses into the interior via heat conduction; it makes the workpiece fused by controlling the width, energy, peak power, repetition frequency and other parameters to form a specific weld pool.

At present, in the process of the welding of headlight and back light of plastic parts in automobile lighting industry, it commonly uses laser welding process for the welding of an object, however, in practice application, it was found that in the process of laser welding, when welding, the welding state of the welding bead is not stable, and since the laser beam is reflected onto the object through the laser mirror, and the objects are mostly irregular figure with curved surface, angel or likely, and it may cause reflection and other defects when the laser generator irradiates, and it may further cause the energy of the laser to be partially reflected, i.e. the energy of the laser cannot be focused on the objects entirely (the emission end of the laser generator is not on the normal line of the welding of the objects); and it makes the welding unstable.

SUMMARY OF THE INVENTION

Regarding the above mentioned problems, the application discloses a device for simultaneous laser welding, which can be used in a process of the synchronous welding of object comprising a base and a lens, and the device comprises:

a lifting cylinder;

a first bearing plate, fixedly arranged above the lifting cylinder;

a second bearing plate, arranged above the first bearing plate through a welding cylinder;

a moving lower, arranged above the second bearing plate, and configured to clamp the base;

a fixing upper die, arranged above the moving lower die, and to clamp the lens; and a laser source; and a light pipe;

wherein, the laser source and the light pipe are configured above the fixing upper die, and the light pipe is positioned between the laser source and the lens; and with the lifting cylinder driving the base to move to a position for welding through the first bearing plate and the second bearing plate, to make the lens attach onto the base; after the process performed by the light pipe to the laser beam emitted from the laser source, the laser beam passing through the lens and focusing to a welding region of the base for heating; meanwhile, the welding cylinder drives the moving lower die through the second bearing plate to press the base and the lens together.

As a preferred embodiment of the invention, in the above mentioned device:

a clamping fixture is fixedly arranged on the moving lower die, and the base is fixedly arranged on the clamping fixture;

as a preferred embodiment of the invention, in the above mentioned device:

the light pipe comprises a body and a fixed block, and the fixed block is fixed on the fixing upper die; and after the process performed by the body to the laser beam emitted from the laser source, the laser beam is emitted to the welding region for heating;

as an preferred embodiment of the invention, in the above mentioned device:

a plurality of mounting holes are configured on the fixing upper die; and the body is fixed on the fixing upper die through the plurality of mounting holes, to form a structural shape fitting the welding region;

as a preferred embodiment of the invention, in the above mentioned device:

the body is a tubular structure; and after the process performed by the body to the laser beam emitted from the laser source, the laser beam forms distributed strips of welding facula, and the welding facula is emitted to the welding region of the object for heating.

As a preferred embodiment of the invention, in the above mentioned device:

the material of the body is a transparent material.

The invention also discloses a process for simultaneous laser welding, which can be used for welding the object, comprising a base and a lens, and the process comprises:

fixing the base on the clamping fixture configured on the moving lower die, and continuing to perform a shape-based positioning;

clamping the lens onto the fixing upper die, to make the lens above the base; and using the lifting cylinder to drive the base to a position of welding to make the lens attach onto the base;

the laser beam emitted from the laser source being shaped by the light pipe, and the laser beam passing through the lens and being focused to the welding region for heating; meanwhile, using the welding cylinder to drive the moving lower die to press the base and the lens together.

As a preferred embodiment, in the above mentioned process for simultaneous laser welding:

the light pipe comprises a body and a fixed block, and the fixed block is fixed on the fixing upper die; and after the process performed by the body to the laser beam emitted from the laser source, the laser beam emits to the welding region for heating.

As a preferred embodiment, in the above mentioned process for simultaneous laser welding:

a plurality of mounting holes are configured on the fixing upper die; and the body is fixed on the fixing upper die through the plurality of mounting holes, to form a structural shape fitting the welding region on the base.

As a preferred embodiment, in the above mentioned process for simultaneous laser welding:

the body is a tubular structure; and after shaping conducted to the laser beam emitted from the laser source, the laser beam forms strips of facula, and the welding facula emits to the welding region for heating.

As a preferred embodiment, in the above mentioned process for simultaneous laser welding:

the material of the body is a transparent material.

As a preferred embodiment, in the above mentioned process for simultaneous laser welding:

when welding the object with the process for the simultaneous laser welding, no powder is generated, and size of the generated waste selvage is:

0<H<0.4 mm;

0<w<0.4 mm;

wherein the H represents heights of the waste selvage, and the w represents widths of the waste selvage.

The above mentioned technical scheme has the following beneficial effects and advantages:

the invention discloses a process and device for simultaneous laser welding, after using the moving lower die and the fixing upper die to make the base and the lens attached, by using the light pipe made by, for example, polycarbonate, glass or other cheap materials, to make the laser, which is emitted from the laser source, emit through the lens to the welding region after being processed, to operate rapid and average heating to the welding region; meanwhile, using the welding cylinder to press the base and the lens together, to make base and the lens pressed and welded together in molten state, and when welding, it does not generate powder or other defects, and, at the same time, it can make the size of the generated waste selvage (i.e. flash) to be less than 0.4 mm, which can improve the performance of welding objects more efficiently.

BRIEF DESCRIPTIONS OF THE DRAWINGS

As shown in the attached drawings, it illustrates the embodiments of the invention more sufficiently. However, the drawings are only for explaining and illustration, not to limit the range of the invention.

DETAILED DESCRIPTION

The process and device for simultaneous laser welding of the invention can, on the basis of the traditional process and device for simultaneous laser welding, by using transparent heat-resisting cheap material to make a light pipe, after process performed to the laser emitted from the laser source, form welding facula, so as to weld the object; more specifically, after using the moving lower die and the fixing upper die to make the base and the lens attached, by using the light pipe made by cheap material, to make the laser, which is emitted from the laser source, emitted through the lens to the welding region of the base after being processed, to operate rapid and average heating to the welding region; meanwhile, using the welding cylinder to press the base and the lens together, to make the base and the lens pressed and welded together in molten state, and when welding, it does not generate powder or other defects, and, at the same time, it can make the height and the width of the generated waste selvage to be less than 0.4 mm, which can improve the performance of welding object more efficiently.

The following is a specific illustration to the device and the process for the simultaneous laser welding of the invention with the drawings and the embodiments.

Since the welding strength of the process for laser transmission welding (i.e. the process for transmissivity infrared welding) fits the strength range of basis material, and it also has advantages, for example: it is an non-contact flexible welding process; the components to be welded bears the least thermal stress; the mechanical pressure is small; no powder and flash overflow is generated; no vibration work is included; the appearance of the welding is good looking; it is high-precision; the welding strength is high; and it is without die loss; etc., which make the process able to be applied to thermoplastic plastics for welding.

When performing the process for laser transmission welding (i.e. the process for ransmissivity infrared welding), it has specific requirements of optical properties for the combination of the material of the objects, which is that one of the combination component must be transparent to the laser, and normally, the thermoplastic plastics in its original color state is transparent to the laser beam, and the other one must absorb the entire laser energy; for example, applying an additional material (such as carbon black) to the thermoplastic material can bring the effect of absorbing energy; and it requires to do welding in the strength range of substrate material.

Figure 1:
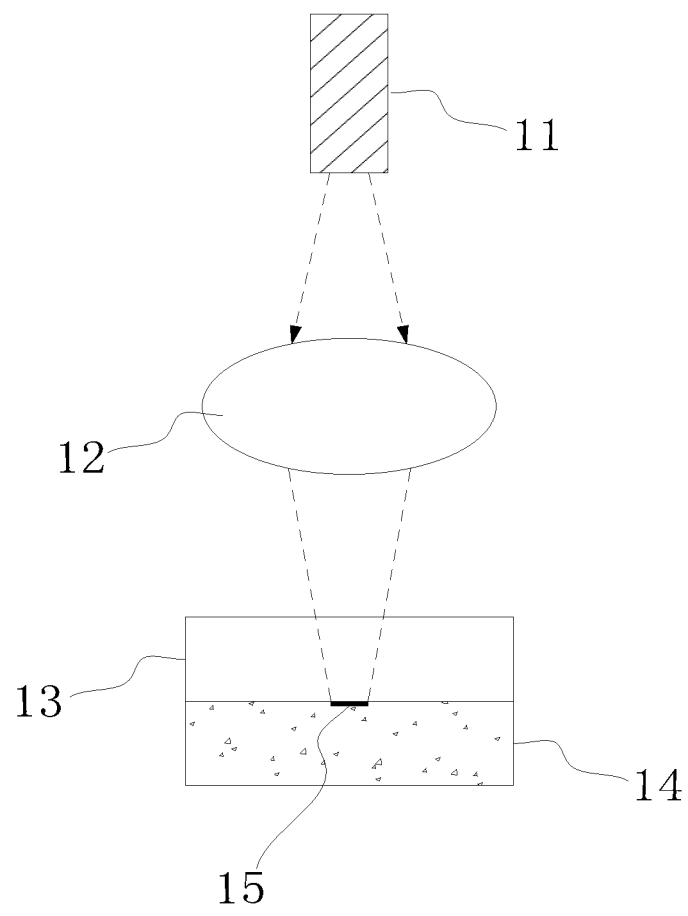
FIG. 1 is a schematic diagram of operating the process for laser welding to a thermoplastics material.

FIG. 1 is a schematic diagram of operating the process for laser welding to a thermoplastic material; As shown in FIG. 1, when applying the process for laser transmission welding (i.e. the process for transmissivity infrared welding) for welding a thermoplastics plastic, it commonly makes the laser beam pass through the transparent workpiece 13 (i.e. the lens) and to the laser absorption workpiece 14 (i.e. the base) and from welding facula 15 of which the energy is distributed, after the process performed by the light pipe 12 to the laser beam emitted from the laser source 11, the welding facula emits to the welding region of the laser absorption workpiece for district heating and fusing, so as to make the transparent workpiece 13 and the laser absorption workpiece 14 welded together, which is that the above mentioned laser beam passes through a transparent substance (i.e. transparent workpiece 13) and emits to the laser absorption workpiece 14 to absorb the energy of the laser for generating heat energy, and when laser welding, since the two workpieces (which are the transparent workpiece 13 and the laser absorption workpiece 14) are pressed together by a clamp, the heat energy is conducted from the laser absorption workpiece 14 to the transparent workpiece 13, so as to melt and combine the welding regions of the two workpiece, which are pressed closely together; at the same time, because of thermal expansion and other properties of the plastic itself, an inside pressure is generated; the inside pressure and the pressure of the outside clamp come to effect at the same time, so as to ensure the two workpieces pressed closely together can be welded tightly.

Figure 2:
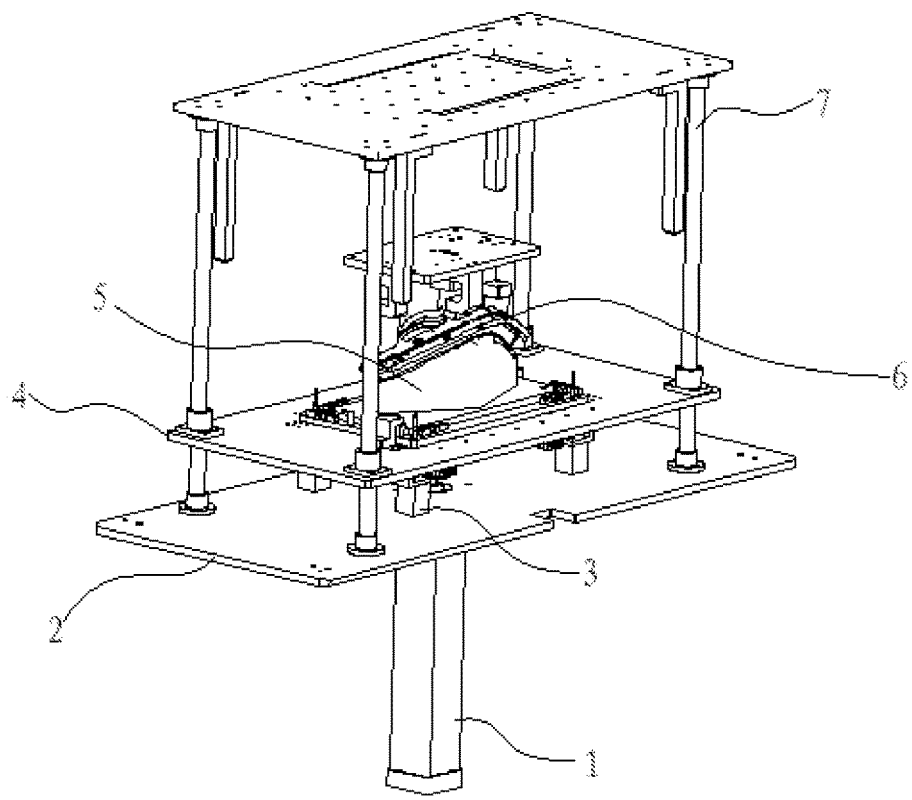
FIG. 2 is a structure diagram of the device for simultaneous laser welding of this invention.
Figure 3:
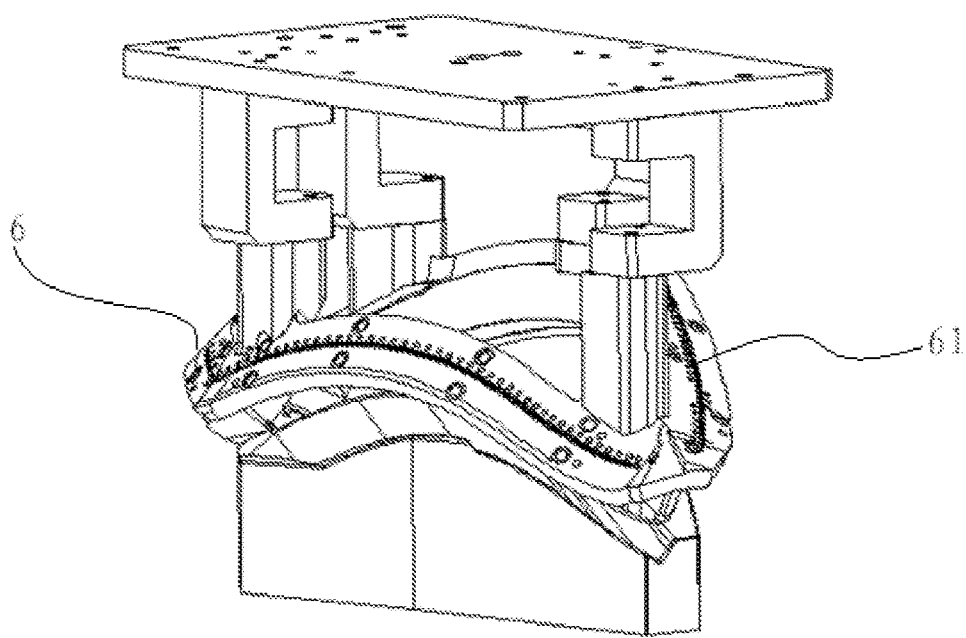
FIG. 3 is a structure diagram of the light pipe configured on the fixing upper die shown in FIG. 2 of the invention.
Figure 4:
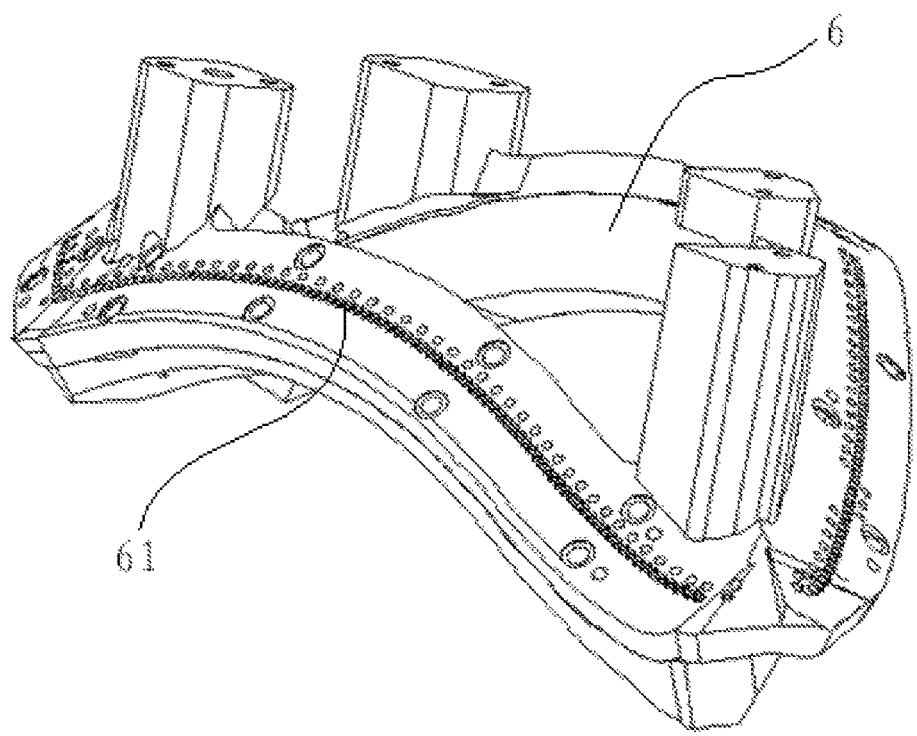
FIG. 4 is a structure diagram of the fixing upper die shown in FIG. 2 of the invention.
Figure 5:
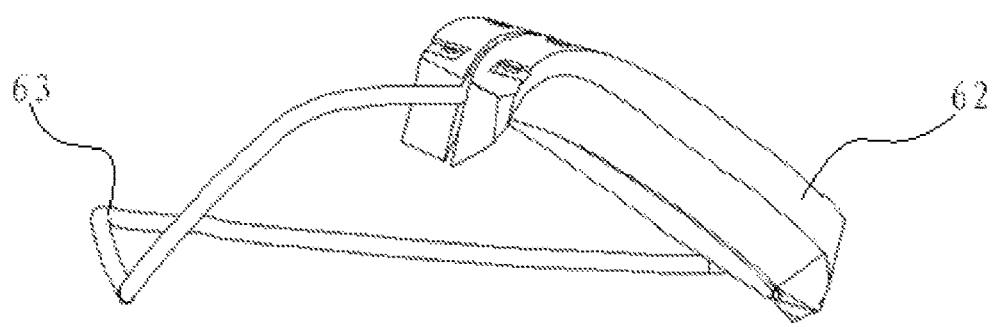
FIG. 5 is a structure diagram of the light pipe.

FIG. 2 is a structure diagram of the device for simultaneous laser welding of this invention; FIG. 3 is a structure diagram of the light pipe configured on the fixing upper die; FIG. 4 is a structure diagram of the fixing upper die shown in FIG. 2; and FIG. 5 is a structure diagram of the light pipe; as shown in FIGS. 2 to 5, on the basis of the structure and the relevant illustration shown in FIG. 1, the invention provides a device for the simultaneous laser welding, which can be applying in the process of synchronous welding of the object, which includes a base (i.e. the laser absorption workpiece 14) and a lens (i.e. the transparent workpiece 13), and the above mentioned device comprises:

a lifting cylinder 1, which can be fixedly arranged on a customized platform for operating process in the industry, and the number of the lifting cylinder 1 may be one or more, only to make the components configured on it can maintain being horizontal and be inside the parameter range in the industry; preferably, the lifting cylinder 1 may be a up-and down motion cylinder for lifting components commonly used in the industry, as the lifting cylinder 1 may comprises: cylinder barrel, end cover, piston, piston rod, seal ring and other components;

a first bearing plate 2, which is fixedly arranged above the lifting cylinder, for configuring other component structure of the subsequent process for simultaneous laser welding on the top surface of the first bearing plate 2; for example, the first bearing plate 2 can be arranged on the top of the piston rod of the above mentioned lifting cylinder 1 flatly, for driving the up-and-down motion of the component structures arranged on the first bearing plate 2 and above when the lifting cylinder 1 operating (e.g. lifting), and the first bearing plate 2 maintains that the horizontal direction of the plate surface to be invariant and the vertical direction moves up and down, when the first bearing plate 2 moves up and down.

a second bearing plate 4, which is arranged above the first bearing plate 2 through a welding cylinder 3 (the welding cylinder 3 may also comprises cylinder barrel, end cover, piston, piston rod, seal ring and other components); correspondingly, when the second bearing plate 4 moves up and down, the second bearing plate 4 maintains that the horizontal direction of the plate surface to be invariant and the vertical direction moves up and down;

a moving lower die 5, which is arranged above the second bearing plate, and is configured to clamp the base; for example, with a clamping fixture arranged on the moving lower die 5, and the base arranged on the clamping fixture, it drives the base to move.

a fixing upper die 6, which is arranged above the moving lower die, and to clamp the lens; for example, the fixing upper die can be fixedly arranged above a die-set 7, to make the fixing upper die 6 arranged above the moving lower die 5, so as to make the lens and the base aligned.

furthermore, a laser source 11 and a light pipe 12, which are configured above the fixing upper die 6, and the light pipe 12 is between the laser source 11 and the laser lens (i.e. the transparent workpiece 13);

When operating the process for laser welding, the lifting cylinder 1 drives the base fixed thereon (i.e. the laser absorption workpiece 14) to move to the preset position for welding (which can be set in accordance to the specific process requirements and the structure parameter of the welding process) through the first bearing plate 2 and the second bearing plate 4, to make the lens (i.e. the transparent workpiece 13), which is fixed on the fixing upper die 6, attach onto the base (i.e. the laser absorption workpiece 14); the light pipe 12 processes the laser beam emitted from the laser source 11, and the laser beam passes through the lens (i.e. transparent workpiece 13) and focuses to a welding region (i.e. laser absorption workpiece 14) to form welding facula 15 for heating for a preset time, which is just enough to make the object present molten state for welding, so as to make both the welding region (i.e. laser absorption workpiece 14) and the region of the lens (i.e. transparent workpiece 13) touched with the base (i.e. laser absorption workpiece 14) heated to present molten state; meanwhile, with the above mentioned welding cylinder 3 driving the second bearing plate 4 and the moving lower die 5 pressing the base (i.e. laser absorption workpiece 14) and the lens (i.e. transparent workpiece 13), so as to make the lens (i.e. transparent workpiece 13) welded with the base (i.e. laser absorption workpiece 14).

Preferably, as shown in FIG. 5, the light pipe comprises a body 62 of the light pipe and a fixed block 63 of the light pipe, which are mutually fixed and connected, and the fixed block 63 is fixed on the fixing upper die 6, so that, after the process performed by the body 62 of the light pipe to the laser beam emitted from the laser source 11, the laser beam is emitted to the welding region of the above mentioned base for heating.

Preferably, as shown in FIGS. 3-5, a plurality of mounting holes 61 may be configured on the fixing upper die 6, for fixing the body 62 to the light pipe on the fixing upper die 6 through bolts or other fixing components; and the shape of the fixed body 62 of the light pipe fit with the welding region of the object, so that the laser beam processed by the body 62 of the light pipe operates rapid and average heating to the welding region.

Preferably, the above mentioned body 62 of the light pipe may be a tubular structure, so as to make the laser beam formed welding facula after the process performed by the light pipe to the laser beam emitted from the laser source, which is that the welding facula emits to the welding region of the object for heating; The material of the above mentioned body can be conventional transparent heat-resisting material.

Figure 6:
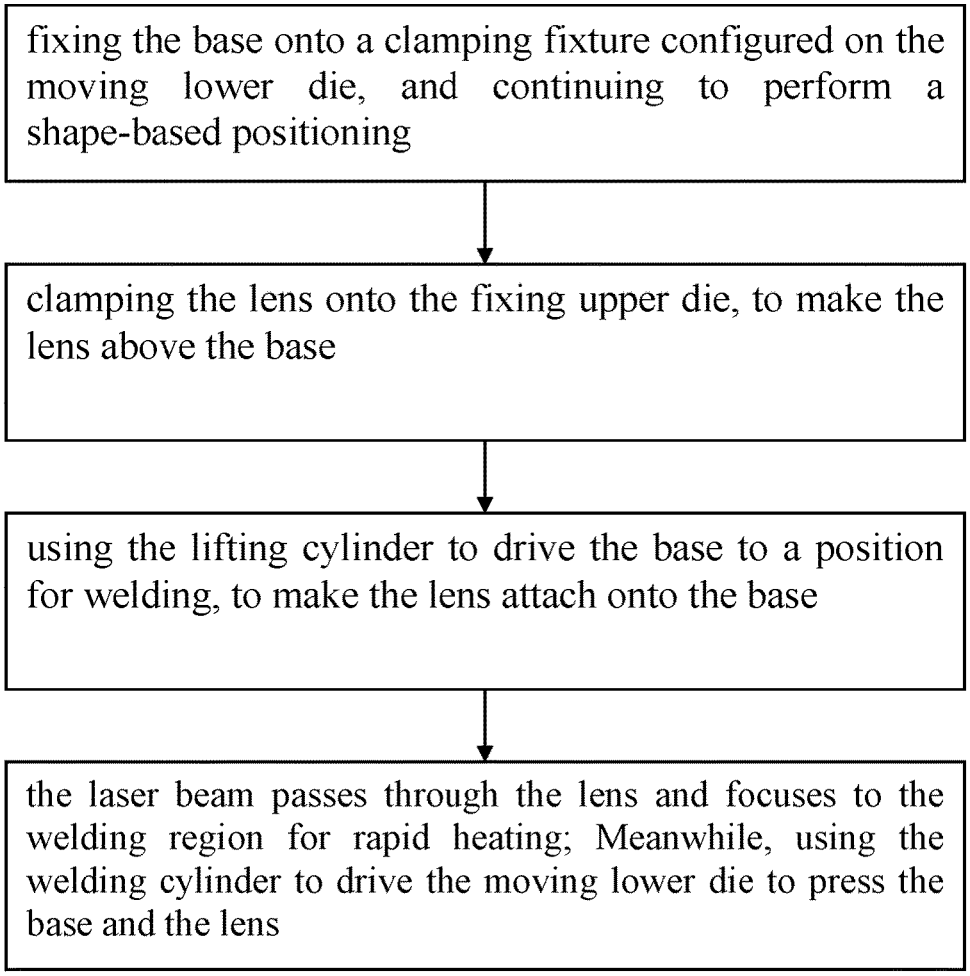
FIG. 6 is a flow chart of the process for simultaneous laser welding of the invention.

FIG. 6 is a flow chart of the process for simultaneous laser welding of the invention. The invention also provides a process for simultaneous laser welding, which is based on the above mentioned device for welding the object, which includes a base (i.e. the laser absorption workpiece 14) and a lens (i.e. the transparent workpiece 13), and the process comprises:

first, fixing the base (i.e. the laser absorption workpiece 14) on the clamping fixture configured on the moving lower die 5, and fix the position of the shape of the base; Clamp the lens (i.e. the transparent workpiece 13) on the fixing upper die 6, and fix the position of the shape of the lens, so as to make the lens positioned above the base and aligned with the base.

Then, trigger the start button; lifting cylinder 1 driving the base (i.e. the laser absorption workpiece 14) to move to the preset position for welding to make the lens (i.e. the transparent workpiece 13) attach onto the base (i.e. the laser absorption workpiece 14);

then, the laser source 11 emits laser beam; with processing of the light pipe 62, the laser beam passes through the lens and focuses to the welding region (i.e. laser absorption workpiece 14) for rapid heating, so as to make the object in the welding region present molten state; Meanwhile, the welding cylinder 3 driving the moving lower die 5 to press the base (i.e. laser absorption workpiece 14) and the lens (i.e. the transparent workpiece 13), it implements the welding between the lens (i.e. the transparent workpiece 13) and the base (i.e. the laser absorption workpiece 14).

It needs to be noticed that the above mentioned device and process for simultaneous laser welding support with each other, thus the people skilled in the art should know that the technical features that are alike or similar can be used for reference or in common use.

In conclusion, the invention provides a process and device for simultaneous laser welding, after using the moving lower die and the fixing upper die to make the base and the lens attached, by using the light pipe made by, for example, polycarbonate, glass or other cheap materials, to make the laser, which is emitted from the laser source, emit through the lens to the welding region after being processed, to operate rapid and average heating to the welding region; meanwhile, using the welding cylinder to press the base and the lens together, to make base and the lens pressed and welded together in molten state, and when welding, it does not generate powder or other defects, and, at the same time, it can make the size of the generated waste selvage to be less than 0.4 mm (e.g. the height and width are both less than 0.4 mm), which can improve the performance of welding object more efficiently.

For the skilled person in the art, after reviewing the above illustration, all kinds of changes and modifications are obvious. Any people skilled in the art can make possible changes and modifications, or equivalents thereof for the technical solution of the invention according to the above method without falling out of the scope of the invention. Therefore, the various modifications and equivalent arrangements without departing away from the technical solution of the invention are included within the spirit and the scope of the technical solution of the invention.

What is claimed is:

1. A device for simultaneous laser welding, applied to simultaneous welding which is performed to an object comprising a base and a lens, comprising:
    a lifting cylinder;
    a first bearing plate, fixedly arranged above the lifting cylinder;
    a second bearing plate, arranged above the first bearing plate through a welding cylinder;
    a moving lower die, arranged above the second bearing plate, and configured to clamp the base;
    a fixing upper die, arranged above the moving lower die, and configured to clamp the lens;
    a laser source; and
    a light pipe;
    wherein, the laser source and the light pipe are configured above the fixing upper die, and the light pipe is positioned between the laser source and the lens; and
    wherein, the lifting cylinder drives the base to move to a position for welding through the first bearing plate and the second bearing plate, to make the lens attach onto the base; the light pipe shapes laser beam emitted from the laser source, and the laser beam passes through the lens and is focused on a welding region of the base for heating; meanwhile, the welding cylinder drives the moving lower die through the second bearing plate to press the base and the lens together.

2. The device of claim 1, wherein a clamping fixture is fixedly arranged on the moving lower die and the base is fixedly arranged on the clamping fixture.

3. The device of claim 1, wherein the light pipe comprises a body and a fixed block, and the fixed block is fixed above the fixing upper die; and
    after process performed by the body to the laser beam emitted from the laser source, the laser beam is emitted to the welding region for heating.

4. The device of claim 3, wherein a plurality of mounting holes are configured on the fixing upper die; and
    the body is fixed on the fixing upper die through the plurality of mounting holes, to form a structural shape fitting the welding region.

5. The device of claim 3, wherein the body is a tubular structure; and
    after the process performed by the body to the laser beam emitted from the laser source, the laser beam forms welding facula in distributed strips, and the welding facula is emitted to the welding region for heating.

6. The device of the process of claim 3, wherein a material of the body is a transparent material.

7. A process for simultaneous laser welding, applied to simultaneous welding which is performed to an object comprising a base and a lens, using the device of claim 1, comprising:
    fixing the base onto a clamping fixture configured on the moving lower die, and continuing to perform a shape-based positioning;
    clamping the lens onto the fixing upper die, to make the lens above the base; and
    using the lifting cylinder to drive the base to a position for welding, to make the lens attach onto the base;
    wherein, after process performed to the laser beam emitted from the laser source, the laser beam passes through the lens and is focused on the welding region for heating; meanwhile, using the welding cylinder to drive the moving lower die to press the base and the lens together.

8. The process of claim 7, wherein the light pipe comprises a body and a fixed block, and the fixed block is fixed above the fixing upper die; and
    After the process performed by the body to the laser beam emitted from the laser source, the laser beam is emitted to the welding region for heating.

9. The device of claim 8, wherein a plurality of mounting holes are configured on the fixing upper die; and
    the body is fixed on the fixing upper die through the plurality of mounting holes, to form a structural shape fitting the welding region.

10. The device of claim 8, wherein the body is a tubular structure; and
    after the process performed by the laser beam emitted from the laser source, the laser beam forms welding facula in distributed strips, and the welding facula is emitted to the welding region for heating.

11. The process of claim 8, a material of the body is a transparent material.

12. The process of claim 8, wherein, during the process, no powder is generated, and a size of generated waste selvage is:
    $0 < H < 0.4$ mm;
    $0 < w < 0.4$ mm;
    wherein the H represents heights of the waste selvage, and the w represents widths of the waste selvage.

* * * * *